US011925978B2

(12) United States Patent
Nakamura et al.

(10) Patent No.: US 11,925,978 B2
(45) Date of Patent: Mar. 12, 2024

(54) ALUMINUM COMPONENT AND MANUFACTURING METHOD FOR SAME

(71) Applicant: Kabushiki Kaisha F.C.C., Hamamatsu (JP)

(72) Inventors: Yoshiharu Nakamura, Hamamatsu (JP); Hiroyuki Kondo, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 607 days.

(21) Appl. No.: 16/898,507

(22) Filed: Jun. 11, 2020

(65) Prior Publication Data

US 2020/0298304 A1   Sep. 24, 2020

Related U.S. Application Data

(63) Continuation of application No. PCT/JP2018/045612, filed on Dec. 12, 2018.

(30) Foreign Application Priority Data

Dec. 12, 2017   (JP) .................................. 2017-237787

(51) Int. Cl.
*B22D 25/02* (2006.01)
*B22D 17/00* (2006.01)
(Continued)

(52) U.S. Cl.
CPC .............. *B22D 25/02* (2013.01); *C22C 21/02* (2013.01); *F16D 13/64* (2013.01); *B22D 17/00* (2013.01);
(Continued)

(58) Field of Classification Search
None
See application file for complete search history.

(56) References Cited

U.S. PATENT DOCUMENTS 3,881,365 A * 5/1975 Hardy ................. F16H 55/0886
74/462
7,562,756 B2   7/2009 Nakagomi
(Continued)

FOREIGN PATENT DOCUMENTS

CN   101730806 A   6/2010
CN   101796315 A   8/2010
(Continued)

OTHER PUBLICATIONS

Salvendy, Handbook of Industrial Engineering—Technology and Operations Management, Third Edition, 2001, Wiley & Sons, Inc., pp. 562-564. (Year: 2001).*
(Continued)

*Primary Examiner* — Adam Krupicka
(74) *Attorney, Agent, or Firm* — Harness, Dickey & Pierce, P.L.C.

(57) ABSTRACT

An aluminum component and a method for manufacturing the aluminum component has a forming step and a cutting step. Projections (f) extend in an axial direction and are continuously arranged in a circumferential direction. End portions of the projections (f) are cut along a processing line having a predetermined processing diameter (D) providing splines (S) of predetermined dimensions. Side surfaces (fa) are inclined to be tapered in a direction from a base end to a projecting end. A portion of each side surface (fa) adjacent to the projecting end is an inclined surface (fb) with an inclination angle less than an inclination angle of a portion of the side surface that is adjacent to the base end.

6 Claims, 18 Drawing Sheets

(51) Int. Cl.
*C22C 21/02* (2006.01)
*F16D 13/64* (2006.01)

(52) U.S. Cl.
CPC ............... *F16D 2200/003* (2013.01); *F16D 2250/0007* (2013.01)

(56) References Cited

U.S. PATENT DOCUMENTS

| | | | | |
|---|---|---|---|---|
| 2009/0318257 | A1* | 12/2009 | Hawkins | ............ F16H 63/3026 74/606 R |
| 2012/0061203 | A1* | 3/2012 | Harmon | ................ F16D 13/644 192/107 M |
| 2014/0021005 | A1* | 1/2014 | Greiss | .................. F16J 15/3252 192/112 |
| 2015/0362021 | A1 | 12/2015 | Heitzenrater | |

FOREIGN PATENT DOCUMENTS

| | | |
|---|---|---|
| CN | 102401020 A | 4/2012 |
| CN | 105317868 A | 2/2016 |
| DE | 19530443 A1 | 10/1996 |
| EP | 0389024 A1 | 9/1990 |
| JP | 60-180732 | 9/1985 |
| JP | 2-299785 | 12/1990 |
| JP | H04-125317 A | 4/1992 |
| JP | H06-185541 A | 7/1994 |
| JP | 2003-287056 A | 10/2003 |
| JP | 2006-275089 A | 10/2006 |
| JP | 2009-144890 A | 7/2009 |
| JP | 2010-537146 A | 12/2010 |
| JP | 2013-31895 A | 2/2013 |
| WO | WO-2009/081919 A1 | 7/2009 |

OTHER PUBLICATIONS

KHK Gears, Involute Gear Profile, Oct. 30, 2017, The Wayback Machine (https://web.archive.org/web/20171011301633320/https://khkgears.net/new/gear_knowledge/gear_technical_reference/involute_gear_profile.html). (Year: 2017).*
Nyamagoudar, Chamfering and Deburring External Parallel Axis Gears, Nov./Dec. 1996 (Year: 1996).*
International Search Report in corresponding PCT Application No. PCT/JP2018/045612 dated Feb. 26, 2019.
Japanese Office Action dated Oct. 8, 2021 in corresponding Japanese Application No. 2017-237787.
Supplementary European Search Report dated Aug. 12, 2021 in corresponding European Application No. 18889906.6.
Chinese Office Action dated Jul. 5, 2021 in corresponding Chinese Application No. 201880079646.X.

* cited by examiner

[Fig. 1]
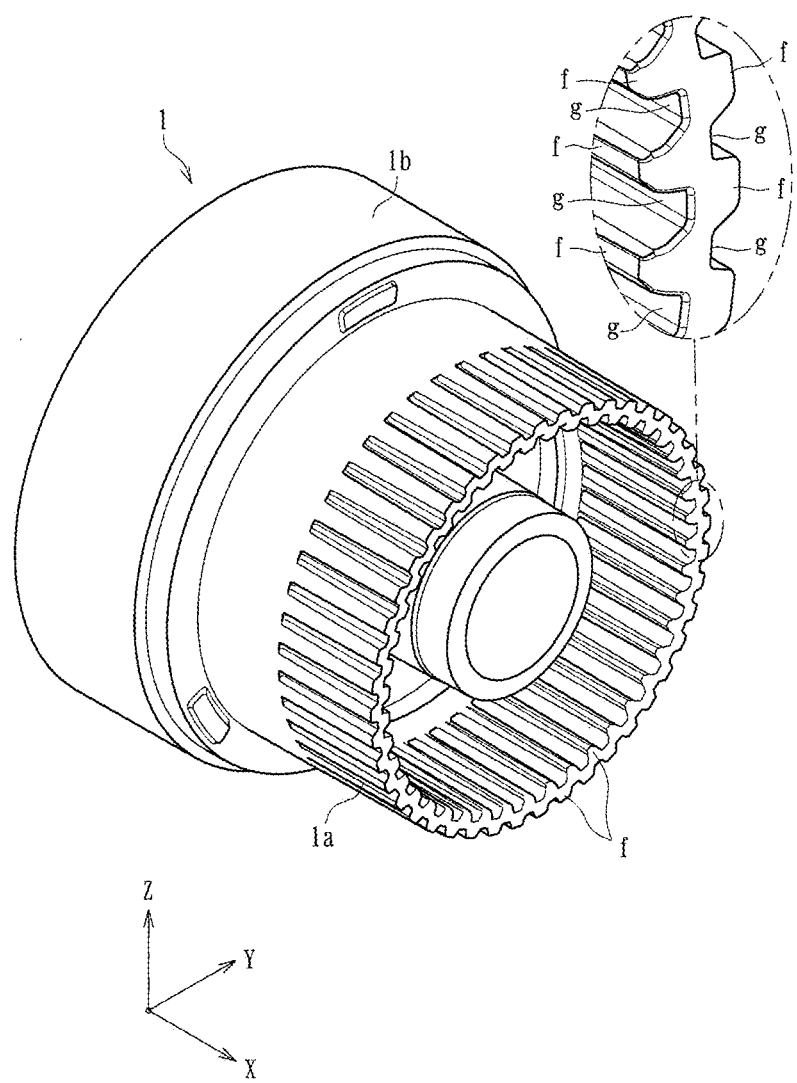

[Fig. 2]
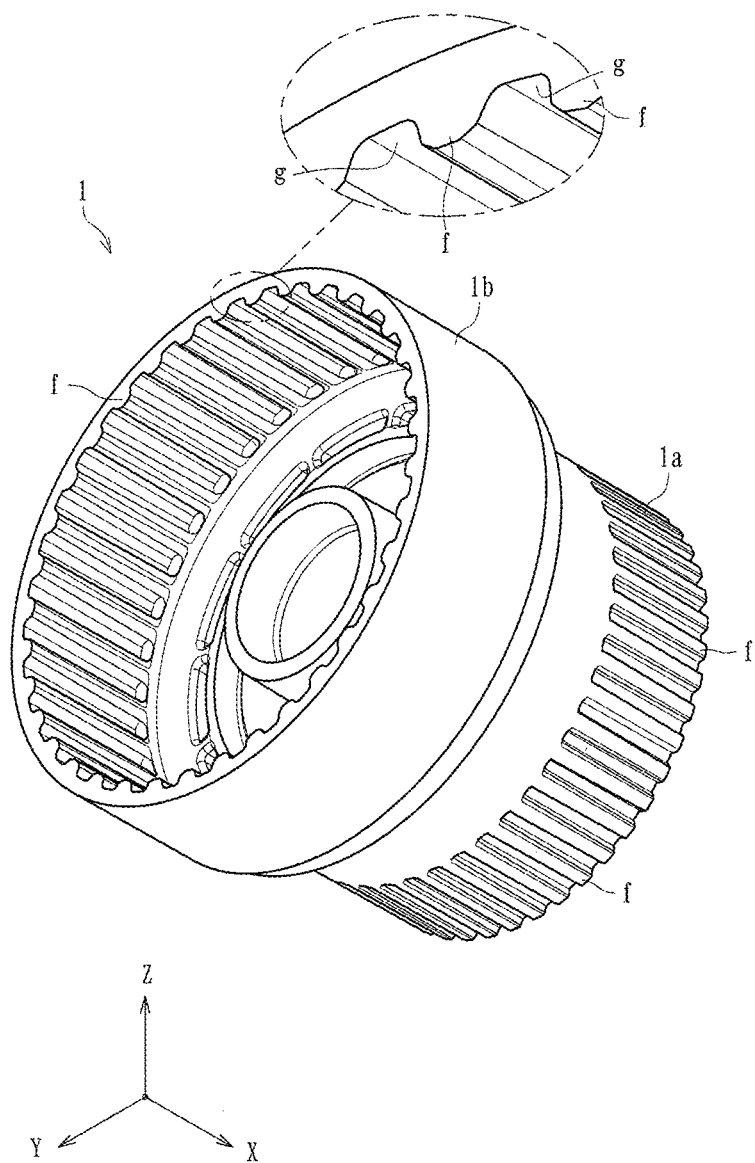

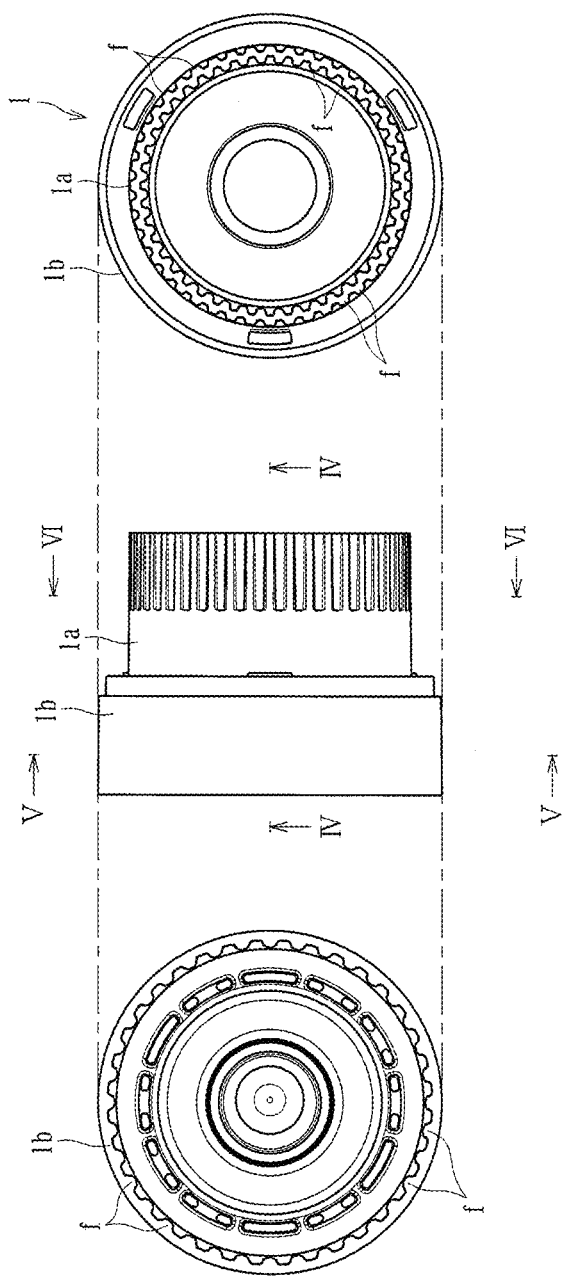
[Fig. 3]

[Fig. 4]
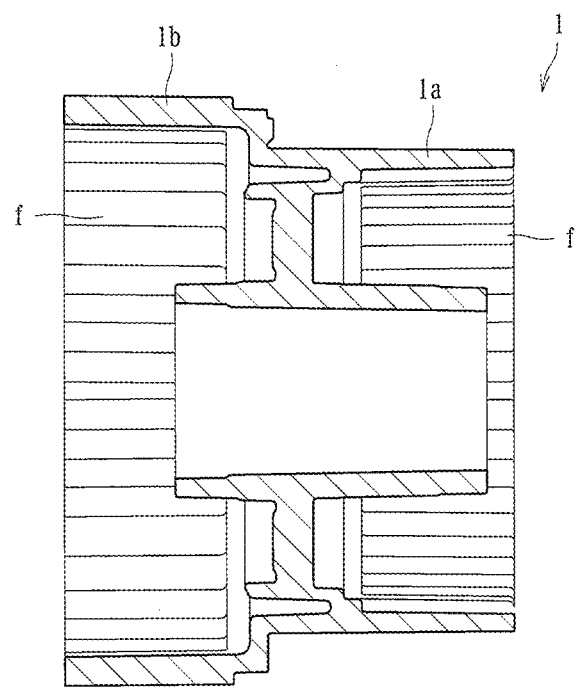
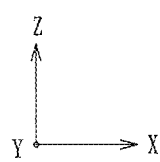

[Fig. 5]
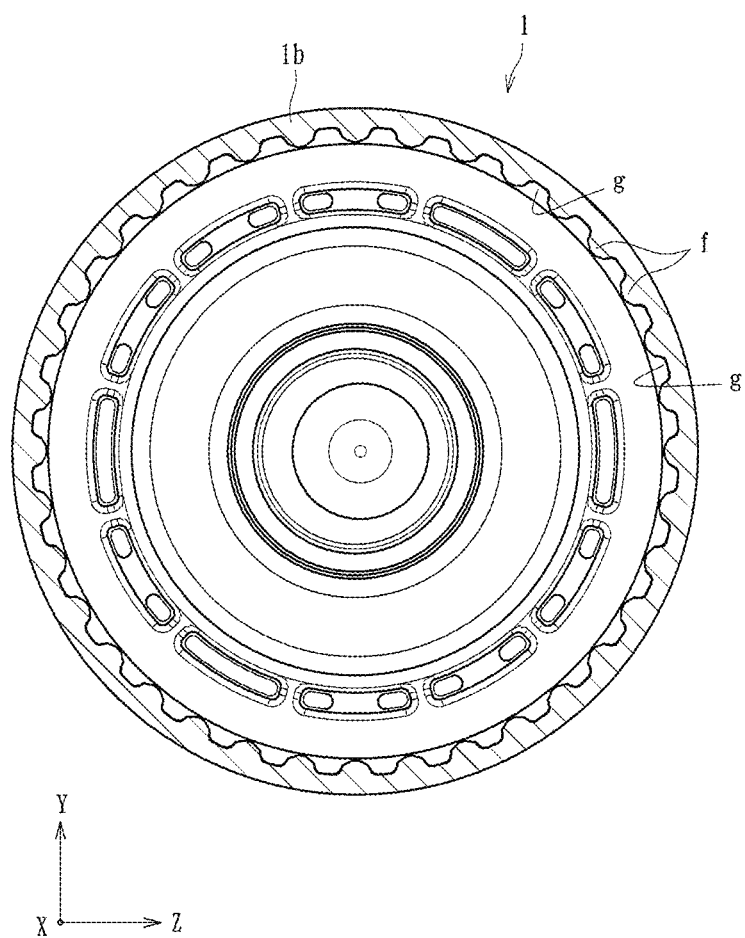

[Fig. 6]
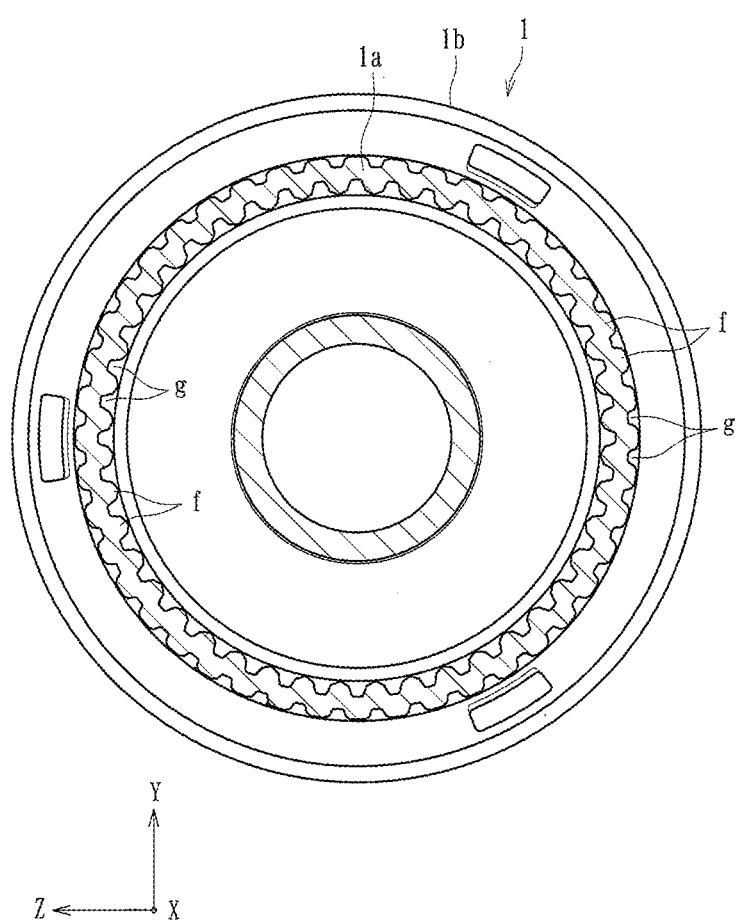

[Fig. 7]
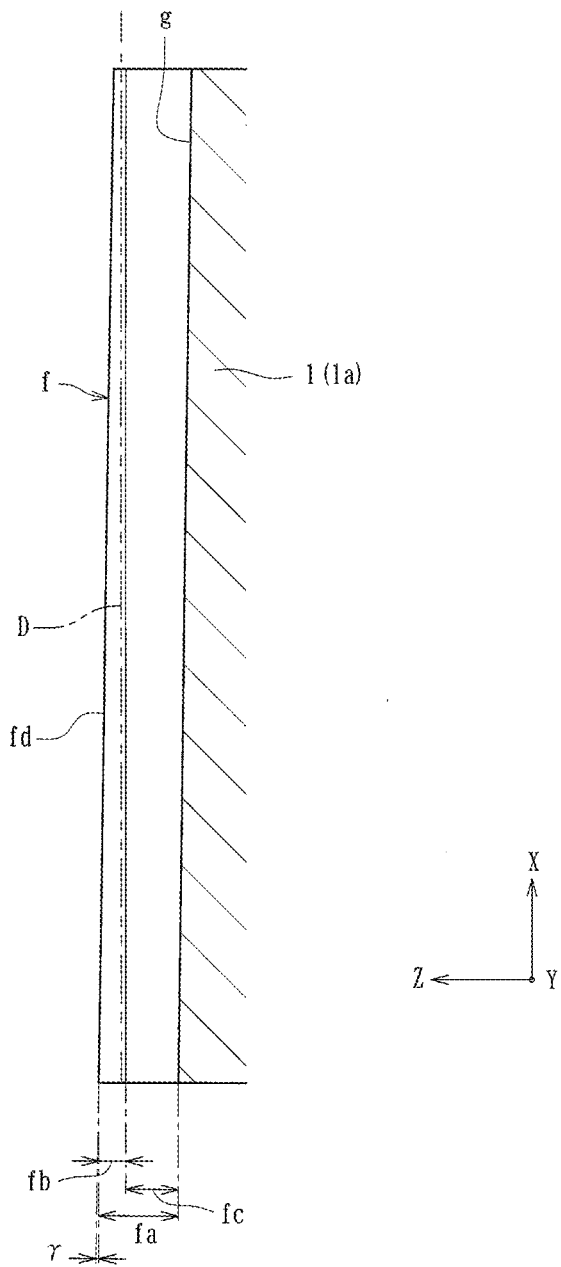

[Fig. 8]
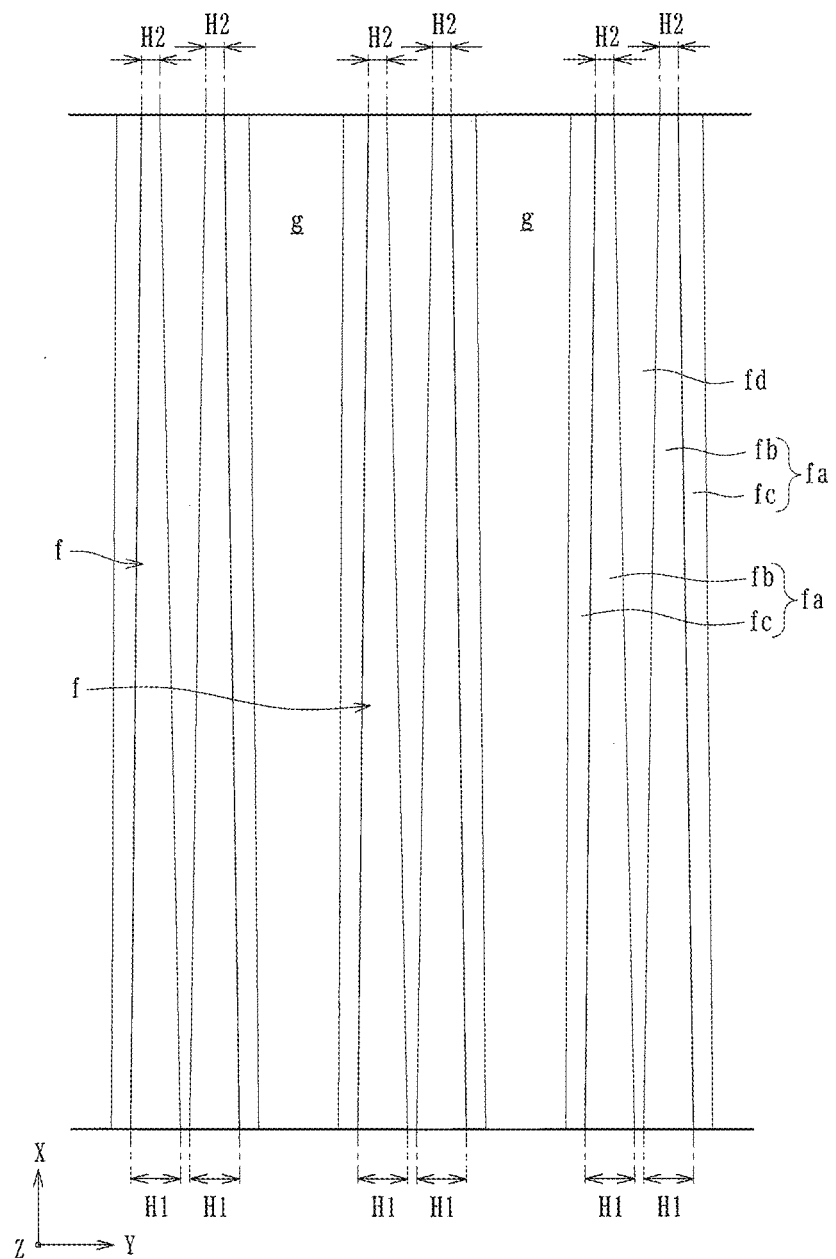

[Fig. 9]
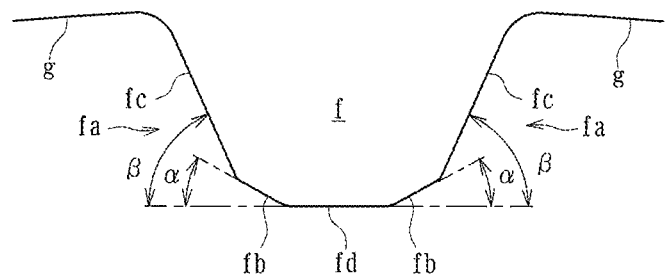
[Fig. 10]
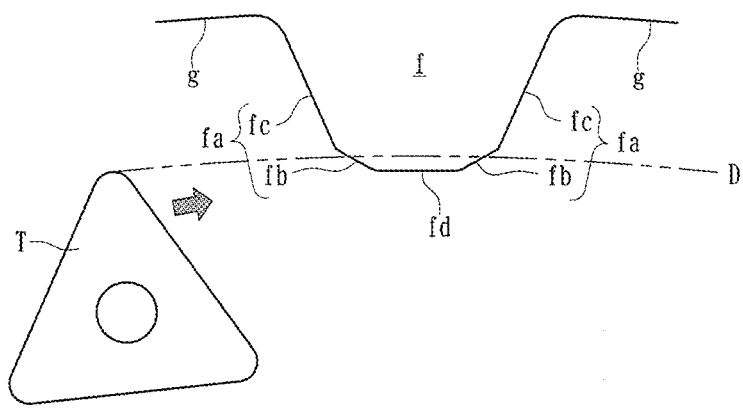
[Fig. 11]
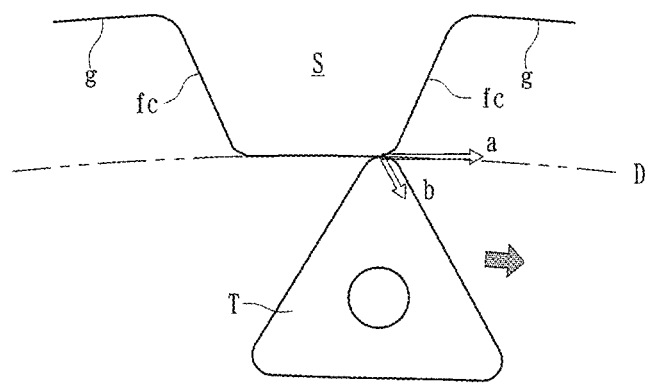

[Fig. 12]
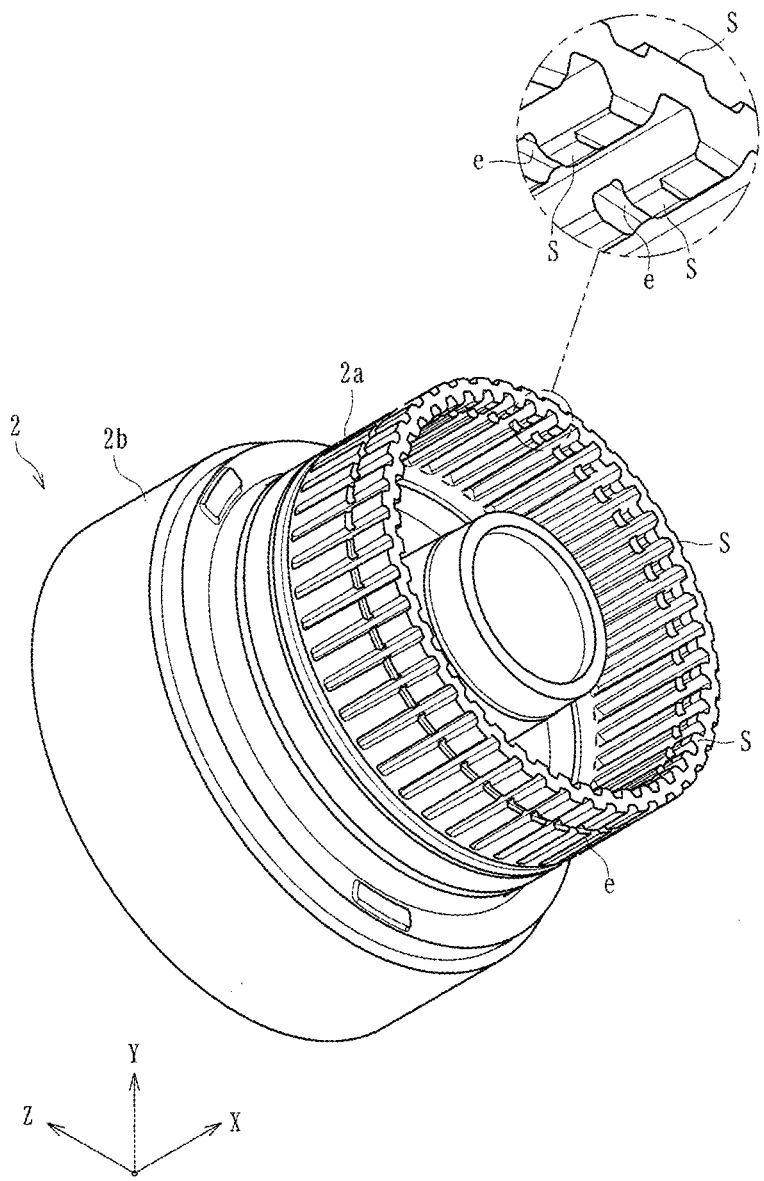

[Fig. 13]
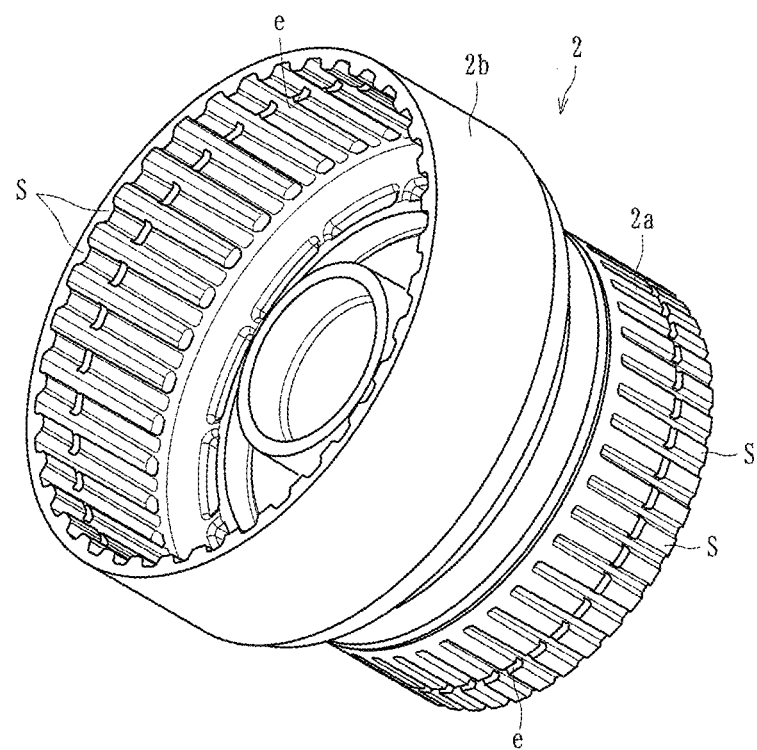

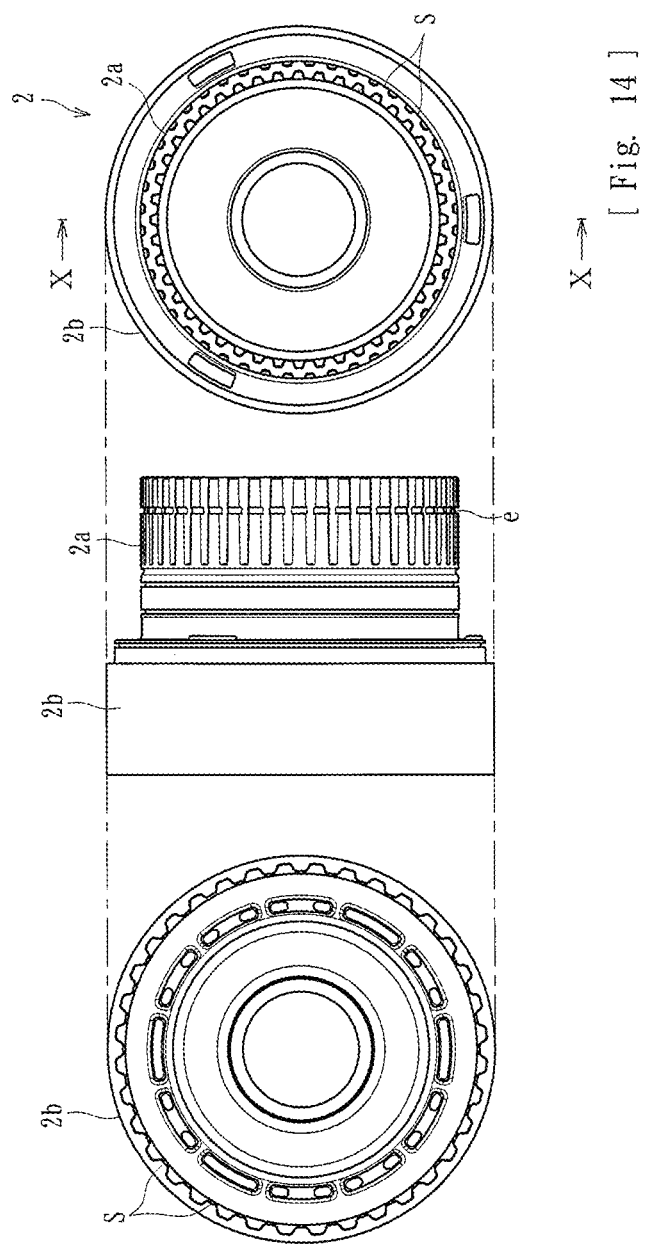

[Fig. 15]
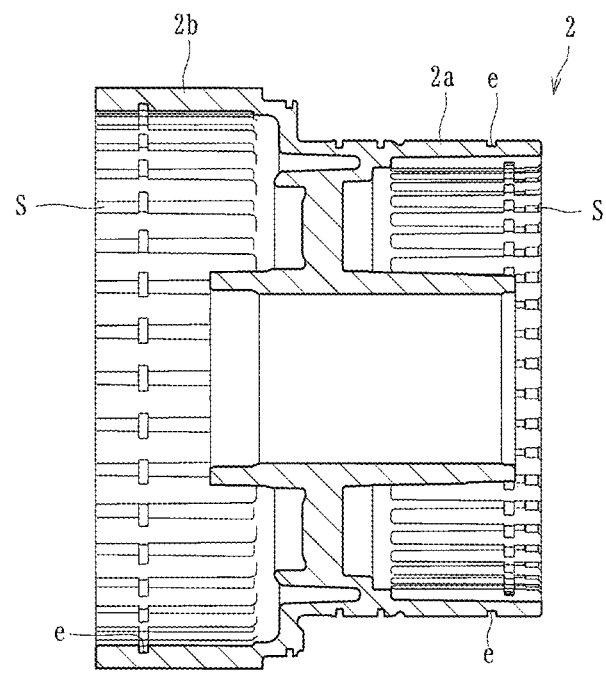

[Fig. 16]
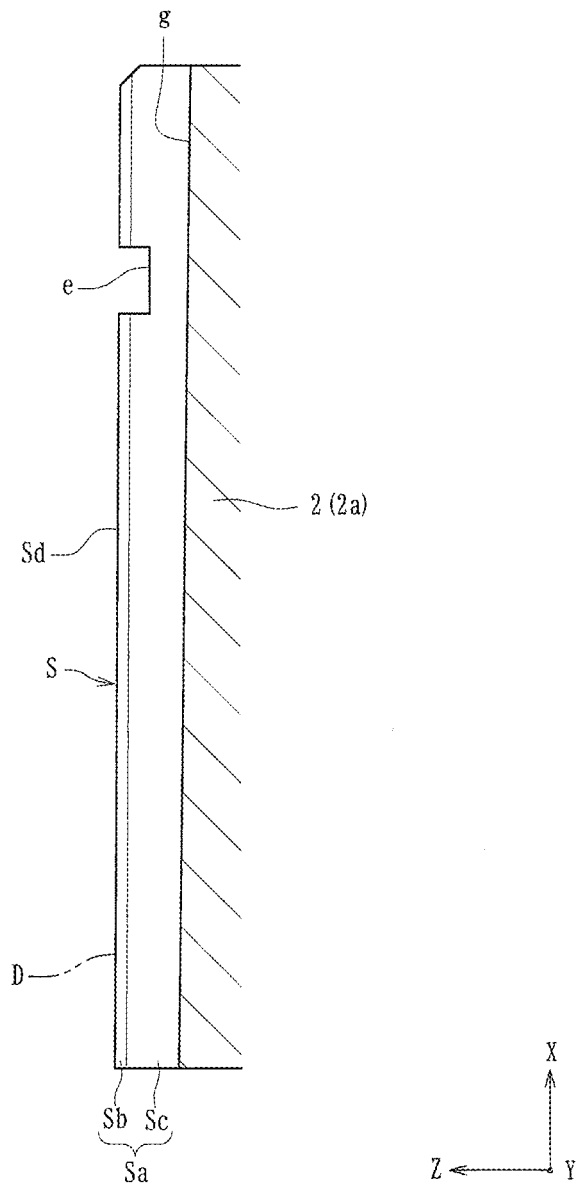

[Fig. 17]
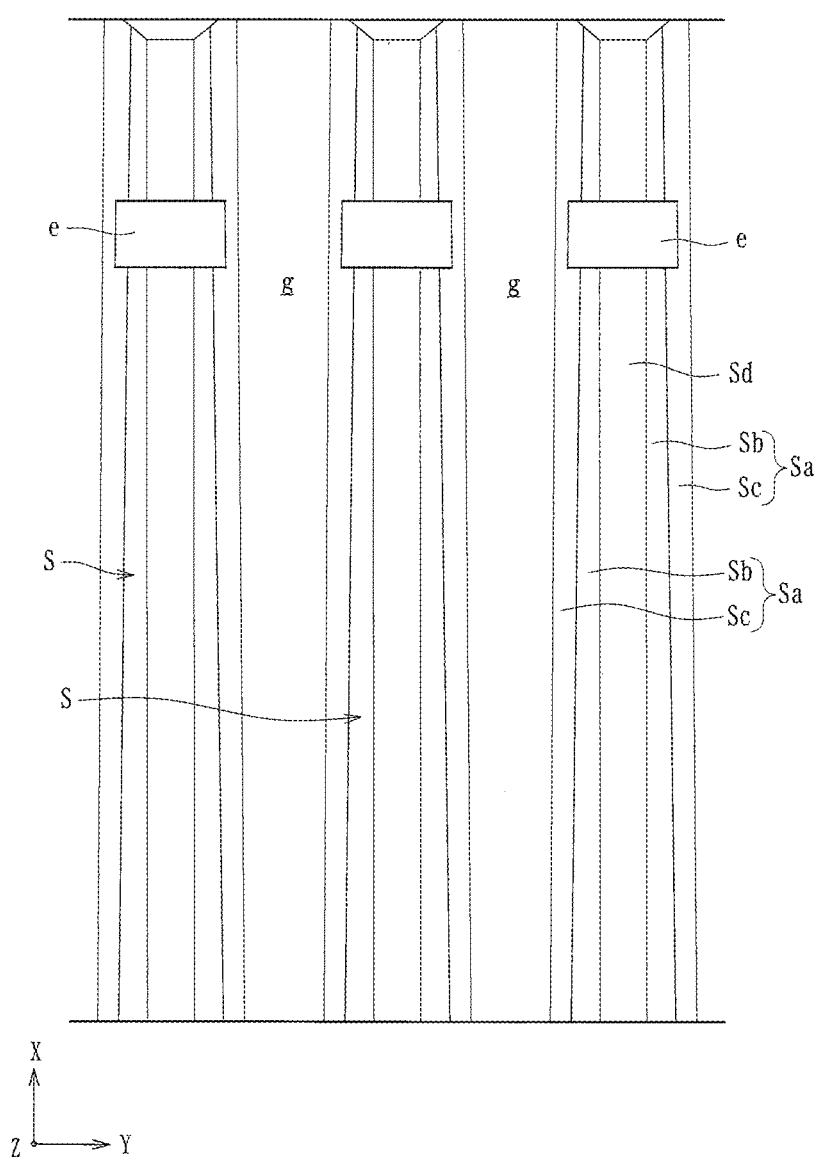

[ Fig. 18 ]
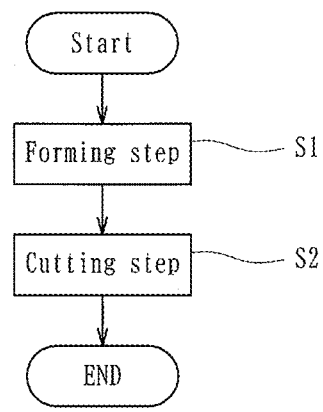

[Fig. 19]
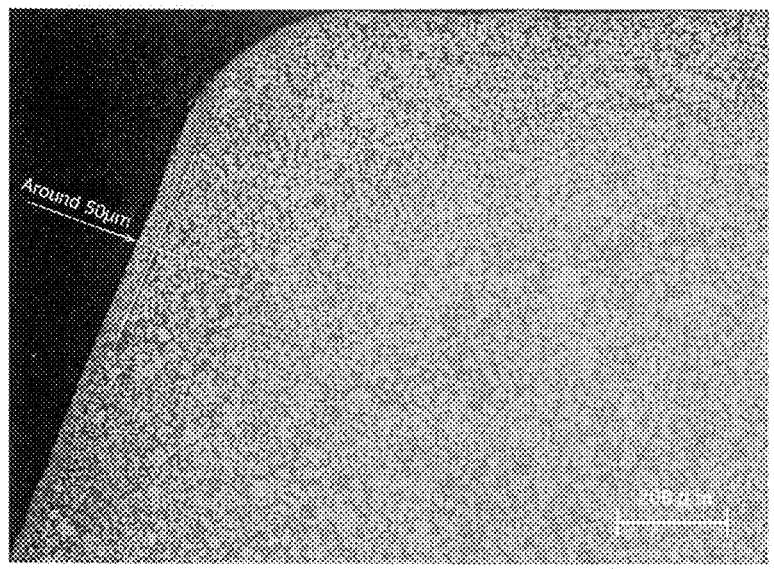
[Fig. 20]
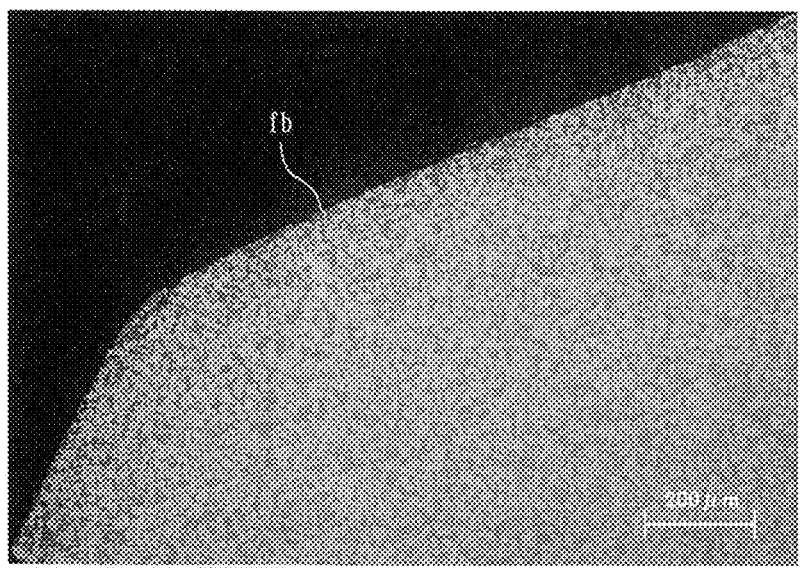

[Fig. 21]
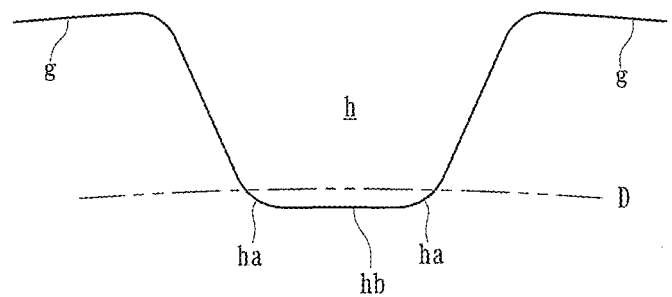
[Fig. 22]
(a)
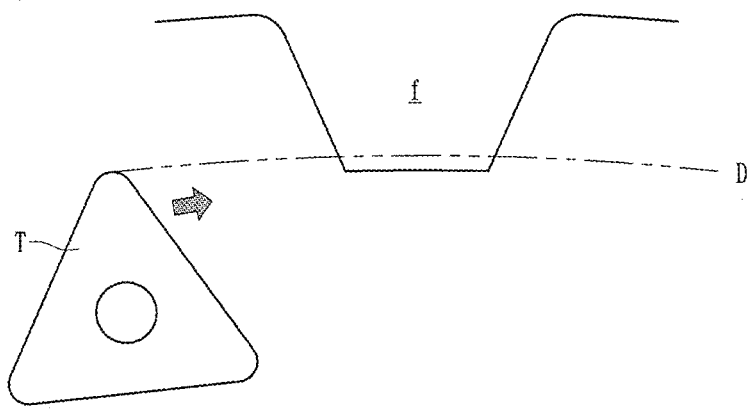
(b)
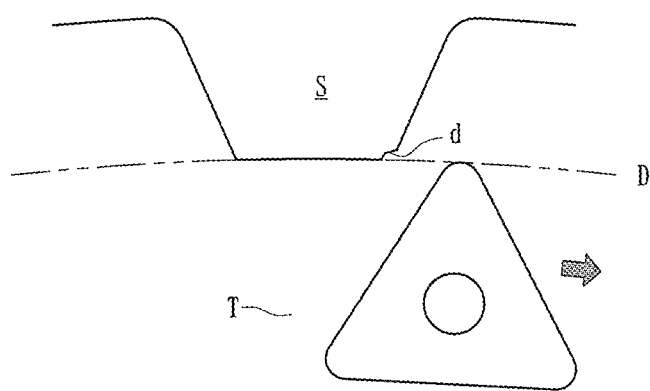

ALUMINUM COMPONENT AND MANUFACTURING METHOD FOR SAME

CROSS-REFERENCE TO RELATED APPLICATIONS

This application is a continuation of International Application No. PCT/JP2018/045612, filed Dec. 12, 2018, which claims priority to Japanese Application No. 2017-237787, filed Dec. 12, 2017. The disclosures of the above applications are incorporating herein by reference.

FIELD

The present disclosure relates to an aluminum component with projections that extend in an axial direction and are continuously arranged in a circumferential direction and also to a method for manufacturing the aluminum component.

BACKGROUND

A typical multiple disc clutch device mounted in, for example, an automobile includes a clutch housing. The clutch housing is formed from a metal material into a cylindrical shape. The clutch housing has splines. Clutch plates or clutch discs are fit on an inner peripheral surface or an outer peripheral surface of the splines. The clutch housing with the splines is obtained by, for example, a forming step and a cutting step. In the forming step, an aluminum material is cast into an aluminum casting. The casting has projections that extend in an axial direction and are continuously arranged in a circumferential direction. In the cutting step, projecting end portions of the projections, formed in the forming step, are cut. More specifically, they are processed with an NC lathe along a processing line with a predetermined processing diameter to form splines with predetermined dimensions. This related art does not relate to disclosures known to the public through publications, and therefore there is no information of related art documents to be cited.

SUMMARY

Unfortunately, according to the above-described related art, when the splines, of predetermined dimensions, are formed by cutting the projecting end portions of the projections by an NC lathe, there is a risk that portions of the projections will be chipped when a cutting tool passes. More specifically, referring to FIG. 22(a), when a projecting end portion of a projection f is cut along a processing line having a predetermined processing diameter D with a cutting tool T, there is a risk that a portion (corner portion) of the projection f will fall off. This leaves a chipped portion d on the spline when the cutting tool T passes the projection f, as illustrated in FIG. 22 (b). The spline with the chipped portion d may cause a problem that satisfactory power transmission cannot be achieved when clutch plates or clutch discs are fit onto the spline to provide the clutch function.

The present disclosure has been made in view of the above-described circumstances. The disclosure provides an aluminum component and a method for manufacturing the aluminum component where the occurrence of spline chipping of splines can be reduced.

According to the disclosure, a method for manufacturing an aluminum component comprises a forming step and a cutting step. The forming step obtains an aluminum casting with projections that extend in an axial direction and are continuously arranged in a circumferential direction. The cutting step includes cutting the projecting end portions of the projections, formed in the forming step, along a processing line with a predetermined processing diameter. This obtains splines of predetermined dimensions. Each projection is formed such that side surfaces are inclined to be tapered in a direction from a base end to a projecting end. Thus, a portion of each side surface that is cut adjacent to the projecting end in the cutting step is either an inclined surface or a rounded portion. The inclined surface has an inclination angle less than an inclination angle of a portion of the side surface that is adjacent to the base end.

In the method for manufacturing the aluminum component, the inclination angle of the inclined surface of each projection, with respect to a projecting end surface of the projection, is set in a range of approximately 10° to approximately 50°.

In the method for manufacturing the aluminum component, each projection is formed such that a projecting end surface is inclined with respect to the axial direction. Also, the inclined surface or the rounded portion has a width that is greater in a region where the projecting end surface is high than in a region where the projecting end surface is low.

In the method for manufacturing the aluminum component, the splines are configured to enable fitting an assembly of plurality of clutch plates or clutch discs.

An aluminum component is formed from an aluminum casting with projections. The projections extend in an axial direction and are continuously arranged in a circumferential direction. The projections include projecting end portions. The end portions are to be cut along a processing line with a predetermined processing diameter to obtain splines with predetermined dimensions. Each projection is formed such that its side surfaces are inclined to be tapered in a direction from a base end to a projecting end. A portion of each side surface that is cut adjacent to the projecting end, in the cutting step, is either an inclined surface or a rounded portion. The inclined surface has an inclination angle less than an inclination angle of a portion of the side surface that is adjacent to the base end.

The aluminum component inclination angle of the inclined surface of each projection, with respect to a projecting end surface of the projection, is set in a range of approximately 10° to approximately 50°.

The aluminum component projections are formed such that a projecting end surface is inclined with respect to the axial direction. The inclined surface or the rounded portion has a width that is greater in a region where the projecting end surface is high than in a region where the projecting end surface is low.

In the aluminum component, the splines are configured to allow a plurality of clutch plates or clutch discs to be fit and assembled to it.

According to the disclosure, each projection is formed such that the side surfaces are inclined to be tapered in the direction from the base end to the projecting end. The portion of each side surface that is cut adjacent to the projecting end, in the cutting step, is either the inclined surface or the rounded portion. The inclined surface has inclination angle less than that of the portion of the side surface that is adjacent to the base end. Therefore, the occurrence of chipping of the splines can be reduced.

The inclination angle of the inclined surface of each projection is set in the range of approximately 10° to approximately 50° with respect to the projecting end surface of the projection. Therefore, the occurrence of chipping of the splines can be more effectively reduced.

Each projection is formed such that the projecting end surface is inclined with respect to the axial direction. The inclined surface or the rounded portion has a width that is greater in a region where the projecting end surface is high than in a region where the projecting end surface is low. Therefore, even when each projection has a draft angle, the width of the inclined surface or the rounded portion can be increased in accordance with how easily the chipping occurs depending on the draft angle. Accordingly, the occurrence of chipping of the splines can be more effectively reduced.

The splines are configured to enable fitting and assembly of a plurality of clutch plates or clutch discs. Therefore, when the clutch plates or the clutch discs are reliably fit to the splines to provide a multiple disc clutch function, force can be reliably transmitted or blocked.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front perspective view of an aluminum casting according to an embodiment of the present disclosure.

FIG. 2 is a rear perspective view of the aluminum casting.

FIG. 3 is a three-view, plan elevation plan, of the aluminum casting.

FIG. 4 is a sectional view taken along line IV-IV in FIG. 3.

FIG. 5 is a sectional view taken along line V-V in FIG. 3.

FIG. 6 is a sectional view taken along line VI-VI in FIG. 3.

FIG. 7 is a schematic side view illustrating a projection of the aluminum casting.

FIG. 8 is a schematic plan view illustrating projections viewed from the side of projecting end surfaces.

FIG. 9 is a schematic cross-sectional view illustrating a shape of the projection shape.

FIG. 10 is a schematic cross-sectional view illustrating a projection before being cut.

FIG. 11 is a schematic cross-sectional view illustrating the projection after being cut.

FIG. 12 is a front perspective view of an aluminum component obtained by cutting the aluminum casting.

FIG. 13 is a rear perspective view of the aluminum component of FIG. 12.

FIG. 14 is a three-view, plan elevation plan, of the aluminum component.

FIG. 15 is a sectional view taken along line X-X in FIG. 14.

FIG. 16 is a schematic side view illustrating a spline of the aluminum component FIG. 17 is a schematic plan view illustrating the aluminum component viewed from the side of projecting end surfaces.

FIG. 18 is a flowchart showing manufacturing steps of the aluminum component.

FIG. 19 is a micrograph showing a chilled layer of an aluminum casting having no inclined surface according to the present disclosure.

FIG. 20 is a micrograph showing a chilled layer of an aluminum casting having an inclined surface according to the present disclosure.

FIG. 21 is a schematic view illustrating a projection of an aluminum casting according to another embodiment of the present disclosure.

FIG. 22(*a*) is a schematic view illustrating a projection of an aluminum casting according to the related art before being cut.

FIG. 22(*b*) is a schematic view illustrating the projection after being cut.

DETAILED DESCRIPTION

An embodiment of the present disclosure will now be described with reference to the drawings.

An aluminum component according to the present disclosure includes a clutch housing for a multiple disc clutch device mounted in, for example, a vehicle. Referring to FIGS. 1 to 6, the aluminum component is obtained by forming an aluminum casting 1 integrally formed with a first cylindrical portion 1a and a second cylindrical portion 1b. More specifically, as illustrated in FIG. 18, the aluminum component (clutch housing) according to the present embodiment is obtained by a forming step S1 and a cutting step S2. In the forming step S1, the aluminum casting 1 is obtained with projections f extending in an axial direction X and are continuously arranged in a circumferential direction. In the cutting step S2, projecting end portions of the projections f, formed in the forming step S1, are cut (processed with a lathe) along a processing line. The processing line has a predetermined processing diameter D to form splines S of predetermined dimensions.

The aluminum casting 1 obtained in the forming step S1 will now be described.

The aluminum casting 1 is obtained by introducing an aluminum material, in a molten state, into a cavity of a casting mold at high pressure and speed and then cooling and solidifying the material. In the present embodiment, the aluminum material is a molten metal of aluminum (Al) containing a predetermined amount of silicon (Si). The aluminum casting 1 is integrally formed with the first cylindrical portion 1a and the second cylindrical portion 1b.

The projections f, that extend in the axial direction X, are continuously arranged on each of outer and inner peripheral surfaces of the first cylindrical portion 1a. Also, the projections f are continuously arranged on an inner peripheral surface of the second cylindrical portion 1b over the entire region in the circumferential direction Y. As illustrated in FIGS. 7 to 9, the projections f each have a projecting shape that includes a pair of side surfaces fa and a projecting end surface fd, that projects in a height direction Z. Recesses g are formed between the projections f that are adjacent to each other so that a projecting and recessed pattern extends continuously in the circumferential direction Y.

As illustrated in FIG. 9, each projection f is formed such that the side surfaces fa, base side surfaces fc and inclined surfaces fb, are inclined to be tapered in a direction from a base end, end adjacent to the recesses g, to a projecting end, end adjacent to the projecting end surface fd. The projecting end portion, inclined surfaces fb in the present embodiment, of each projection f is cut along the processing line. The processing line has the predetermined processing diameter D to form the splines S with predetermined dimensions (see, for example, FIG. 11).

As illustrated in FIGS. 9 to 11, each projection f according to the present embodiment is formed such that each side surface fa includes the base side surface fc, adjacent to the base end, and the inclined surface fb, adjacent to the projecting end. A portion of each side surface that is adjacent to the projecting end, inclined surface fb, is cut in the cutting step. The inclined surface fb has an inclination angle less than that of a portion of the side surface that is adjacent to the base end, base side surface fc. More specifically, the inclined surface fb has an inclination angle α with respect to the projecting end surface fd of the projection f. The inclination angle α is less than an inclination angle θ of the base side surface fc, with respect to the projecting end surface fd. In particular, the inclination angle α of the inclined surface fb is preferably in the range of approximately 10° to approximately 50°.

In addition, as illustrated in FIGS. 7 and 8, each projection f according to the present embodiment is formed such that the projecting end surface fd is inclined with respect to the axial direction X, inclined upward in the direction from top to bottom in FIGS. 7 and 8. Each inclined surface fb has a width that is greater in a region where the projecting end surface fd is high (lower region in FIGS. 7 and 8) than in a region where the projecting end surface fd is low (upper region in FIGS. 7 and 8). In other words, as illustrated in FIG. 8, assuming that each inclined surface fb has a width of H1 where the dimension of the projections f in the height direction Z is large and a width of H2 at the side where the dimension of the projections f in the height direction Z is small, H1 is greater than H2.

The above-described aluminum casting 1 is formed into the clutch housing 2, aluminum component, by cutting the projections f in the cutting step S2. As illustrated in FIGS. 12 to 15, the clutch housing 2 is integrally formed with a first cylindrical portion 2a and a second cylindrical portion 2b. The splines S, that are obtained by cutting the projections f, are formed on outer and inner peripheral surfaces of the first cylindrical portion 2a and an inner peripheral surface of the second cylindrical portion 2b.

The splines S formed on the first cylindrical portion 2a and the second cylindrical portion 2b enable fitting and assembly of a plurality of clutch plates. The clutch plates assembled to the clutch housing 2 and clutch discs fit to a clutch member (not shown) are alternately stacked to function as a clutch device (multiple disc clutch) mounted in, for example, a vehicle, such as an automobile. In this case, the clutch discs and the clutch plates are brought into press contact with each other to enable transmission of driving force of the vehicle, and released from the press-contact state to block the transmission of the driving force of the vehicle.

The outer and inner peripheral surfaces of the first cylindrical portion 2a and the inner peripheral surface of the second cylindrical portion 2b each have an attachment groove e that extends in the circumferential direction Y so as to cross the splines S. The attachment grooves e are formed near open ends of the first cylindrical portion 2a and the second cylindrical portion 2b. Circlips that prevent the clutch discs fit to the splines S from being removed are attachable to the attachment grooves e. Although the splines S, according to the present embodiment, are configured to enable fitting and assembly of the clutch plates, the splines S may be configured to enable fitting and assembly of a plurality of clutch discs to provide a multiple disc clutch where the clutch discs and clutch plates, fit to a clutch member (not shown), are alternately stacked.

In the cutting step S2, according to the present embodiment as illustrated in FIGS. 10 and 11, the projecting end portion, inclined surfaces fb, of each of the projections f formed in the forming step S1 is cut, processed with a lathe, along the processing line with the predetermined processing diameter D by using a cutting tool T to form the splines S of predetermined dimensions, required dimensions of a finished component. More specifically, when the cutting tool T of the lathe rotates along the processing line with the predetermined processing diameter D (in practice, the aluminum casting 1 rotates with respect to the cutting tool T that moves in the axial direction), the cutting tool T comes into contact with the inclined surface fb of one of the side surfaces fa of each projection f. The tool T then passes the inclined surface fb of the other side surface fa (see FIG. 11).

Each projection f according to the present embodiment is formed such that a cut portion of each side surface fa, adjacent to the projecting end cut in the cutting step S2, is the inclined surface fb with an inclination angle less than that of a portion of the side surface that is adjacent to the base end, base side surface fc. Therefore, as illustrated in FIG. 11, when the cutting tool T passes the inclined surface fb (when the cutting tool T leaves the projection f), a force (b) can be reduced. The force (b) is generated by a force (a) applied to the projection f by the cutting tool T. It acts in a direction to remove a surface of the projection f. Accordingly, the occurrence of chipping can be reduced when the projection f is cut.

As illustrated in FIGS. 16 and 17, the projecting distance of each spline S obtained by the cutting process in the height direction Z is defined by the processing diameter D over the entire region of the spline S in the axial direction X, entire region excluding the region where the attachment groove e is formed. Each spline S includes side surfaces Sa and a projecting end surface Sd. The projecting end surface Sd is a surface formed as a result of the cutting process using the cutting tool T. The side surfaces Sa include base side surfaces Sc and 5b. The side surfaces 5c are the base side surfaces fc of the corresponding projection f that are left uncut. The inclined surfaces Sb are portions of the inclined surfaces fb, portions of the inclined surfaces fb that are connected to the base side surfaces fc, that have not been cut off. Thus, each spline S according to the present embodiment includes the inclined surfaces Sb, that are the portions of the inclined surfaces fb that have not been cut off, in a region adjacent to the projecting end surface Sd. Therefore, the clutch plates or the clutch discs can be smoothly fit onto the spline S by being guided by the inclined surface Sb.

Each projection f according to the present embodiment is formed such that the projecting end surface fd is inclined with respect to the axial direction X. Thus, each inclined surface fb has a width that is greater in a region where the projecting end surface fd is high than in a region where the projecting end surface fd is low. Therefore, even when the projections f formed in the forming step S1 each have a draft angle (surface inclined downward toward the open end), the occurrence of chipping in the cutting process S2 can be effectively reduced. More specifically, in the case where the projecting end surface fd is inclined, chipping more easily occurs in the region where the projecting end surface fd is high than in the region where the projecting end surface fd is low when the end portion of the projection f is cut by the cutting tool T. Therefore, by forming each inclined surface fb such that the width is greater in a region where chipping easily occurs than in a region where chipping is less likely to occur, the occurrence of chipping of the splines S can be more effectively reduced.

As described above, each projection f according to the present embodiment is formed such that a portion of each side surface fa, that is adjacent to the projecting end and that is cut in the cutting step S2, is the inclined surface fb having an inclination angle less than that of a portion of the side surface that is adjacent to the base end (base side surface fc). Alternatively, referring to FIG. 21, projections h may instead be formed. Each projection h is formed such that a portion of each side surface fa, that is adjacent to the projecting end and that is cut in the cutting step S2, is a rounded portion ha. In this case, similar to the above-described embodiment, preferably, each projection h has a projecting end surface hb that is inclined with respect to the axial direction X. Each rounded portion ha has a width that is greater in a region where the projecting end surface hb is high than in a region where the projecting end surface hb is low.

In the present embodiment, a portion of each side surface fa, that is adjacent to the projecting end and that is cut in the cutting step S2, is the inclined surface fb with an inclination angle less than that of a portion of the side surface that is adjacent to the base end (base side surface fc). Alternatively, a portion of each side surface fa, that is cut adjacent to the projecting end in the cutting step S2, is the rounded portion ha. Therefore, a contact area between a die (casting mold) used in the forming step S1 and an aluminum material (molten metal) is reduced.

Accordingly, the cooling speed at which the molten metal is cooled in the casting process is reduced. The hardness of a metal structure that is generated is uniform between the inner region and the surface layer of the casting. Thus, a chilled layer formed on the surface of the casting (microstructure formed when molten aluminum comes into contact with the die and is suddenly cooled) can be reduced. The chilled layer is harder than the inner structure of the casting. However, it is brittle and easily chipped in the cutting process. Therefore, the occurrence of chipping in the cutting step S2 can be reduced by reducing the formation of the chilled layer.

In particular, in the present embodiment, the aluminum material (molten metal) introduced into the casting mold contains 7.5 to 9.5 weight percent of silicon (Si). More specifically, the composition of the aluminum material (molten metal) used in the forming step S1 of the present embodiment is as follows: 7.5 to 9.5 weight percent of silicon (Si); 2.00 weight percent or less of iron (Fe); 3.00 to 4.00 weight percent of copper (Cu); 0.50 weight percent or less of manganese (Mn); 0.10 weight percent or less of magnesium (Mg); 3.00 weight percent or less of zinc (Zn); 0.35 weight percent or less of tin (Sn); 0.50 weight percent or less of impurities; and aluminum (Al) as the balance. The chilled layer can be effectively reduced by adjusting the content of silicon (Si).

Thus, not only can the chilled layer be reduced due to the shape of the inclined surfaces fb (or the rounded portions ha), but further reduction of the chilled layer can be achieved due to the material. Accordingly, when the molten metal with the above-described composition is cast, the chilled layer formed on each inclined surface fb (or on each rounded portion ha) can be reduced. In the present embodiment, the chilled layer is hardly formed. Therefore, the occurrence of chipping in the cutting step S2 can be reduced. Referring to FIG. 19, a micrograph of a chilled layer on an aluminum casting with no inclined surface fb shows that the chilled layer has a substantially uniform thickness (around 50 μm). In contrast, referring to FIG. 20, a micrograph of a chilled layer on an aluminum casting having the inclined surface fb as in the present embodiment shows that the chilled layer is hardly formed on the inclined surface fb.

When, for example, the aluminum casting including the chilled layer shown in FIG. 19 was cut (processed with a lathe), chipping occurred at a rate of 9%. When the aluminum casting where the chilled layer is hardly formed shown in FIG. 20 was cut (processed with a lathe) under the same processing conditions, such as the feed speed, rotational speed, and cutting depth, chipping occurred at a rate of less than or equal to 2%.

According to the above-described embodiment, each projection f (h) is formed such that the side surfaces fa are inclined to be tapered in the direction from the base end to the projecting end. In addition, a portion of each side surface, fa that is cut adjacent to the projecting end in the cutting step S2, is the inclined surface fb with an inclination angle less than that of a portion of the side surface that is cut adjacent to the base end (base side surface fc). Alternatively, the portion of each side surface fa, that is cut adjacent to the projecting end in the cutting step S2, is the rounded portion ha. Therefore, the occurrence of chipping of the splines S formed on the clutch housing 2 (aluminum component) can be reduced. In particular, the inclination angle α of each inclined surface fb of each projection f, with respect to the projecting end surface fd of the projection f, is set in the range of approximately 10° to approximately 50°. Therefore, the occurrence of chipping of the splines S can be more effectively reduced.

In addition, each projection f (h), according to the present embodiment, is formed such that the projecting end surface fd (hb) is inclined with respect to the axial direction. Each inclined surface fb or each rounded portion ha has a width that is greater in a region where the projecting end surface fd (hb) is high than in a region where the projecting end surface fd (hb) is low. Therefore, even when each projection f (h) has a draft angle, the width of each inclined surface fb or each rounded portion ha can be increased in accordance with how easily the chipping occurs depending on the draft angle. Accordingly, the occurrence of chipping of the splines S can be more effectively reduced.

In addition, the splines S according to the present embodiment are configured to enable fitting and assembly of a plurality of clutch plates or clutch discs. Therefore, when the clutch plates or the clutch discs are reliably fit to the splines S to provide the function of a multiple disc clutch, force can be reliably transmitted or blocked.

Although the present embodiment has been described, the present disclosure is not limited to this. For example, the aluminum casting 1 or the clutch housing 2 that includes the first cylindrical portion (1a, 2a) and the second cylindrical portion (1b, 2b) may be replaced by an aluminum casting or a clutch housing that includes one or three or more cylindrical portions with the projections f (h) or the splines S. In addition, although the aluminum component is the clutch housing 2 in the present embodiment, the aluminum component may instead be another component (including components other than those of a clutch) as long as the splines S are arranged in the circumferential direction.

In addition, although the inclination angle α of each inclined surface fb of each projection f according to the present embodiment with respect to the projecting end surface fd of the projection, f is set in the range of approximately 10° to approximately 50°, the inclined surface fb may have another inclination angle as long as the inclination angle is less than that of a portion of the side surface that is adjacent to the base end (base side surface fc). In addition, although each projection f (h) according to the present embodiment is formed such that the projecting end surface fd (hb) is inclined with respect to the axial direction X, each projection f (h) may instead be formed such that the projecting end surface fd (hb) is not inclined (such that the dimension of each projection f (h) in the height direction Z is constant in the axial direction X).

The aluminum component and the method for manufacturing the aluminum component may also be applied to, for example, components with different shapes or components with additional functions as long as each projection has side surfaces that are inclined to be tapered in a direction from a base end to a projecting end. A portion of each side surface adjacent to the projecting end and that is cut in a cutting step is either an inclined surface or a rounded portion. The inclined surface has an inclination angle less than that of a portion of the side surface that is adjacent to the base end.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A method for manufacturing an aluminum component, the method comprising:
    forming an aluminum casting with projections that extend in an axial direction and that are continuously arranged in a circumferential direction, wherein each projection has side surfaces formed from a portion of the side surface that is adjacent to a base end and a portion of the side surface that is adjacent to a projecting end and formed such that the side surfaces are inclined to be tapered in a direction from the base end to the projecting end;
    cutting projecting end portions of the projections formed in the forming step along a processing line with a predetermined processing diameter, wherein the portion of the side surface that is adjacent to the projecting end is cut in the cutting step;
    forming splines of predetermined dimensions;
    the portion of each cut side surface that is cut adjacent to the projecting end in the cutting step is either an inclined surface or a rounded portion, the adjacent projecting end surface having an inclination angle less than an inclination angle of the portion of the side surface that is adjacent to the base end; and
    each projection is formed such that a projecting end surface is inclined with respect to the axial direction and that the adjacent projecting end surface or the rounded portion has a width in a circumferential direction that is greater in a region where the dimension of the projecting end surface, inclined with respect to the axial direction in the height direction, is large, than in a region where the dimension of the projecting end surface, inclined with respect to the axial direction in the height direction, is small.

2. The method for manufacturing an aluminum component according to claim 1, wherein the inclination angle of the inclined surface of each projection with respect to a projecting end surface, of the projection adjacent the base, of the projection is set in a range of approximately 10° to approximately 50°.

3. The method for manufacturing an aluminum component according to claim 1, wherein the splines are configured to enable fitting and assembly of a plurality of clutch plates or clutch discs.

4. An aluminum casting comprising:
    an aluminum casting with at least two projections that extend in an axial direction away from one another and the at least two projections are continuously arranged in a circumferential direction forming first and second cylindrical walls;
    projecting end portions on the first cylindrical wall are cut along a processing line with a predetermined processing diameter to obtain splines of predetermined dimensions, forming splines of predetermined dimensions on an inner wall portion of the first cylindrical wall and forming splines of predetermined dimensions on a wall portion of the second cylindrical wall; and each projection is formed with side surfaces tapered in a direction from a base end to a projecting end;
    a portion of each side surface that is cut adjacent to the projecting end and that is cut in the cutting step is either an inclined surface or a rounded portion; the adjacent projecting end surface having an inclination angle less than an inclination angle of a portion of the side surface that is adjacent to the base end, and
    each projection is formed such that a projecting end surface is inclined with respect to the axial direction and that the adjacent projecting end surface or the rounded portion has a width, along the axial direction, that is greater in a region where the projecting end surface, furthest from the base, is high, than in a region where the projecting end surface is low.

5. The aluminum casting according to claim 4, wherein the inclination angle of the inclined surface of each projection, with respect to a projecting end surface, of the projection adjacent the base, of the projection, is set in a range of approximately 10° to approximately 50°.

6. The aluminum casting according to claim 4, wherein the splines are configured to enable fitting and assembly of a plurality of clutch plates or clutch discs.

* * * * *

UNITED STATES PATENT AND TRADEMARK OFFICE
CERTIFICATE OF CORRECTION

PATENT NO. : 11,925,978 B2
APPLICATION NO. : 16/898507
DATED : March 12, 2024
INVENTOR(S) : Yoshiharu Nakamura et al.

It is certified that error appears in the above-identified patent and that said Letters Patent is hereby corrected as shown below:

In the Specification

<u>Column 5</u>
Line 10,              Delete "θ" and insert --β--

In the Claims

<u>Column 10</u>
Line 9, Claim 2       Delete "50° ." and insert --50°.--
Line 46, Claim 5      Delete "50° ." and insert --50°.--

Signed and Sealed this
Twenty-first Day of May, 2024

Katherine Kelly Vidal
*Director of the United States Patent and Trademark Office*